United States Patent Office 3,418,556
Patented Dec. 24, 1968

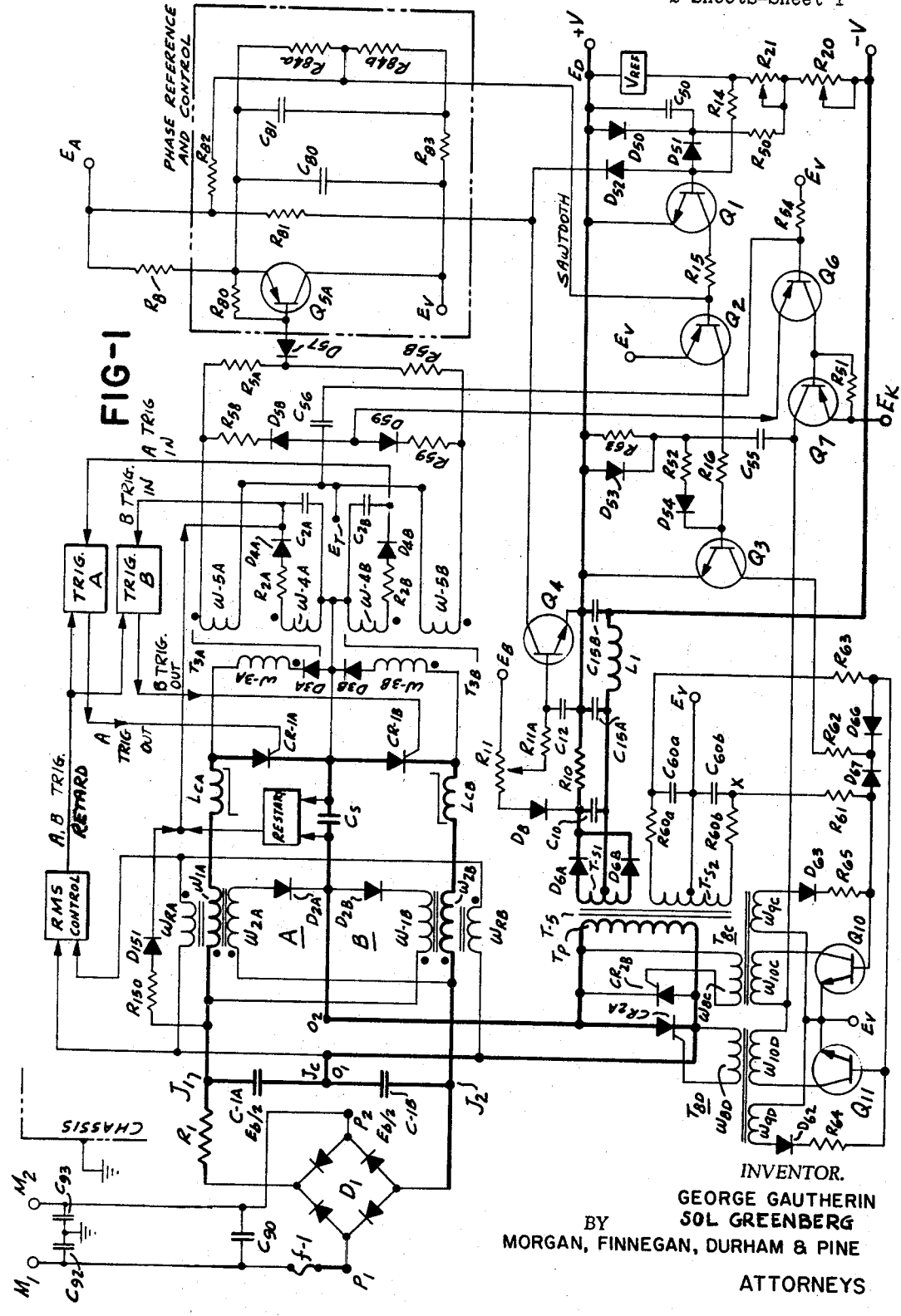
Dec. 24, 1968 — S. GREENBERG ET AL — 3,418,556
ELECTRONIC POWER SUPPLIES WITH RMS CURRENT LIMITING CIRCUIT
Filed May 2, 1966 — 2 Sheets-Sheet 1
INVENTOR.
GEORGE GAUTHERIN
SOL GREENBERG
BY MORGAN, FINNEGAN, DURHAM & PINE
ATTORNEYS

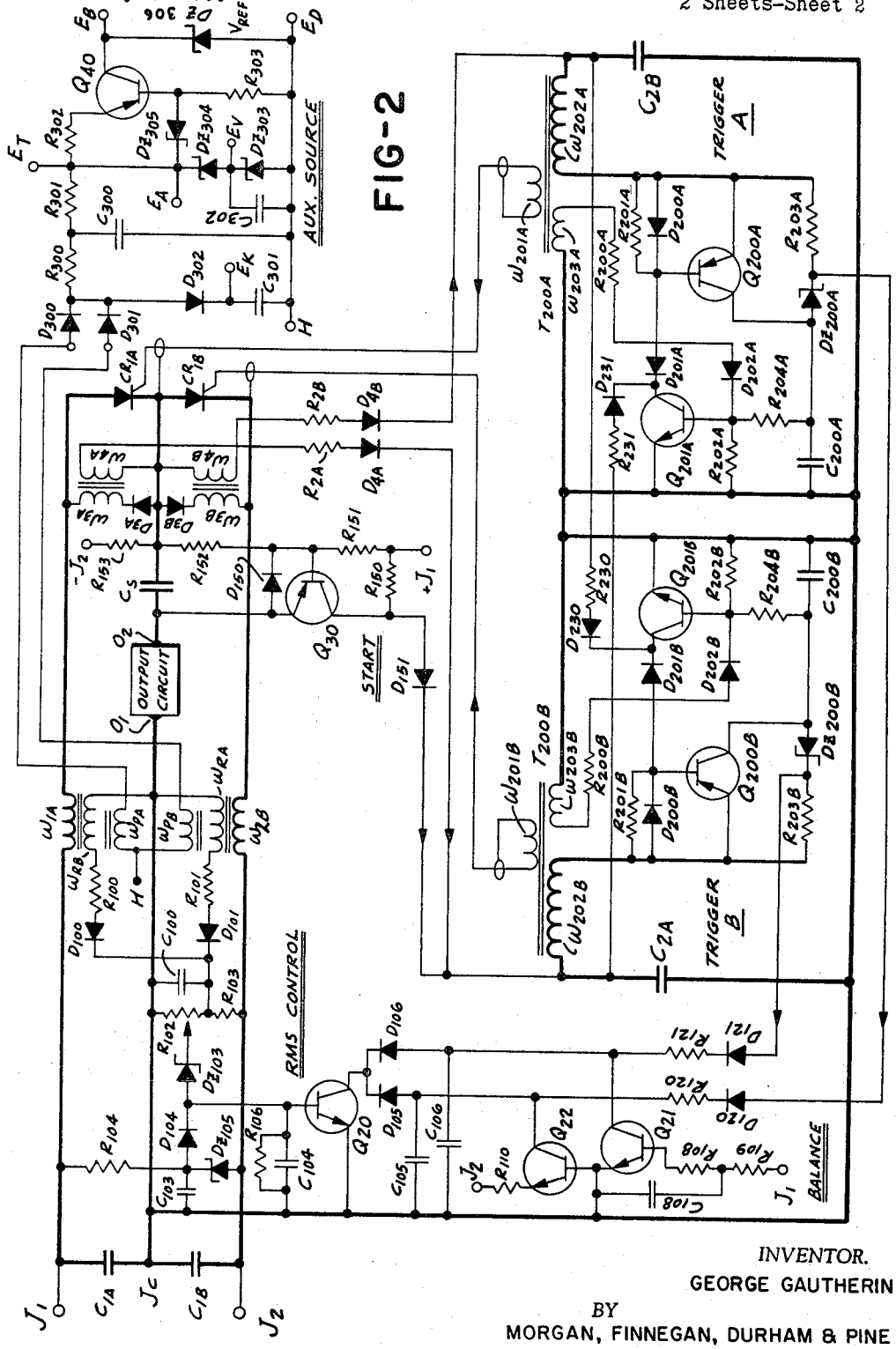

3,418,556
ELECTRONIC POWER SUPPLIES WITH RMS CURRENT LIMITING CIRCUIT
Sol Greenberg, Roslyn, and George Gautherin, Woodside, N.Y., assignors to Lambda Electronics Corporation, Huntington, N.Y., a corporation of New York
Continuation-in-part of application Ser. No. 503,119, Oct. 23, 1965. This application May 2, 1966, Ser. No. 547,054
15 Claims. (Cl. 321—16)

ABSTRACT OF THE DISCLOSURE

Switching type electronic power supplies are disclosed which utilize controlled switches such as controlled rectifiers. The switch circuits are arranged to prevent the buildup of unused power and to limit the RMS current.

---

This application, which relates to electronic power supplies, is a continuation-in-part of copending application Ser. No. 503,119, filed on Oct. 23, 1965, in the name of Sol Greenberg and George Gautherin for High Efficiency Power Supply and assigned to the assignee of the instant invention.

In the exemplary embodiment in said copending application, a series inverter of the center-tapped source type is employed in combination with a power control system and rectifier to produce a regulated output at power levels from zero up to one or more kilowatts, e.g. 5 volts at 200 amperes. The inverter has the capability of high frequency operation and in the illustrated example operates in the region of 10 kc. This arrangement provides high efficiency operation with significant improvement in the ratios of power to weight and power to size, thus enabling packaging in standard rack mountings. The design also permits the elimination of the input power line transformer found in conventional series and shunt DC regulators and this factor contributes to these improvements. They also follow from the relatively high operating frequency of the supply.

Other features of the design include ripple reduction, RFI and spike suppression, rapid response time, and reliable commutation of the controlled regulators. Means are also provided for preventing the buildup of unused power thereby providing stable operation over a wide range of load values from zero to maximum rated load. Also, a significant improvement in efficiency is realized, this feature being enhanced by circuit configurations which materially reduce the RMS/DC ratio.

The present application is directed to further improvements in electronic power supplies and has for its objects, improvements in efficiency obtained by limiting RMS current. While this feature is illustrated by way of example in a supply of the type described in said copending application, the technique is applicable to a wide variety of supplies employing resonant circuits.

Further objects of the invention are to effect improvements in the control system of controlled rectifiers and in the transient behavior of supplies.

Other objects and advantages of the invention will be set forth in part hereinafter and in part will be obvious herefrom or may be learned by practice with the invention, the same being realized and attained by means of the instrumentalities pointed out in the appended claims.

The invention consists in the novel parts, combinations, arrangements, improvements and techniques herein shown and described.

Serving to illustrate an exemplary embodiment of the invention are the drawings of which:

FIGURE 1 is a schematic diagram illustrating the overall power supply system including certain novel stages thereof; and FIGURE 2 is a schematic diagram of control circuit arrangements used in the system of FIGURE 1.

GENERAL DESCRIPTION

In the exemplary embodiment shown in FIGURE 1, and for purposes of explanation, the power-flow circuits are illustrated in heavy lines.

Input AC power is applied to terminals $P_1$ and $P_2$ via source terminals $M_1$, $M_2$ and filters $C_{90}$, $C_{92}$, $C_{93}$; this power is rectified by bridge D1 and applied via resistance R1 to a pair of capacitors C–1A and C–1B. These capacitors, together with the components shown in the heavy lines to the right thereof, constitute a series inverter circuit of the center-tapped source type. This circuit is energized by the voltages appearing across C–1A and C–1B. For illustration, these voltages are each designated $E_b/2$.

The inverter comprises two identical resonant channels; one channel, designated "A," is formed by a series combination of choke winding W–1A, saturable inductance L–CA, controlled rectifier CR–1A, capacitance $C_s$ and the output circuit coupled to terminals $O_1$, $O_2$. The capacitor $C_s$ is common to both channels. The other channel comprises the series combination with $C_s$ and the load, of controlled rectifier CR–1B, saturable inductance L–CB, and choke winding W–2B.

From terminals $O_1$, $O_2$, the generated AC power is supplied as shown in heavy lines, to a power transfer control system controlled by a regulator having shunt connected controlled rectifiers CR–2A, CR–2B, and from thence AC flow is to a rectifier and filter which supplies regulated DC at the output terminals $+V$ and $-V$.

In general, the inverter functions in the following manner: when CR–1A is energized as described hereinafter, power flows from the source represented by the voltage across C–1A, through winding W–1A, inductance L–CA and the controlled rectifier CR–1A, thereby charging up $C_s$ to a value which approaches twice the voltage across C–1A. Consequently, a sinusoidal pulse of current flows through the inverter output terminals $O_1$ and $O_2$. As Capacitor $C_s$ reaches its peak charge, the current in Channel A reverses direction due to the resonant character of the circuit whereupon reverse current is forced through CR–1A causing it to cut off.

As CR–1A is cut off, the reverse current is diverted through a circuit paralleling CR–1A; this circuit includes diode D–3A and winding W–3A of transformer T–3A. This diverted reverse current produces a trigger action as hereinafter described which causes a trigger signal to be generated and applied via the B trigger circuit (TRIG. B) to controlled rectifier CR–1B in the B channel of the inverter. Consequently, after the A channel is cut off, the B channel is activated. When CR–1B is energized, a sinusoidal pulse of current flows through the output terminals in the direction opposite to that produced by channel A. This pulse also flows through $C_s$, the controlled rectifier CR–1B, choke L–CB, and choke winding W–2B. When $C_s$ reaches its peak charge in the opposite direction from that attained during the operation of channel A, reverse current flows in channel B cutting off CR–1B. As soon as the latter is cut off, the reverse current flow is diverted through the input of another trigger circuit which includes winding W–3B of transformer T–3B and diode D–3B. This action actuates the A trigger circuit (TRIG. A) causing a trigger to be applied to the gate of CR–1A. As a result, the A channel is again fired.

It may be seen that the channels operate alternately, producing an alternating current flow at the inverter output terminals $O_1$ and $O_2$. This current is passed through the primary winding T–P of a transformer T–5 with appropriate amounts of the current being diverted as power supply regulation requires. This control is effected by the action of shunt controlled rectifiers CR–2A and CR–2B which are controlled in turn by the error detecting circuit. These rectifiers are oppositely polarized and connected in parallel across primary winding T–P. Hence, a controlled amount of current is delivered to the secondary side of transformer T–5 where it is rectified by diodes D–6A, D–6B and supplied to the output terminals +V, —V via current sensing resistor R10 in the positive leg and filter C–15A, L–1, C–15B.

To reduce certain undesirable effects associated with the lag between the switching times of CR–1A and CR–1B, each branch of the inverter includes the small saturable inductance L–CA, L–CB which functions to improve circuit operation during the switchover period.

Interlock system

It may be noted that the inverter controlled rectifiers (CR–1A, CR–1B) are interlocked in such a manner as to eliminate the possibility of simultaneous conduction of both rectifiers. The controlled rectifier CR–1B in channel B can only be energized provided reverse current has been forced through rectifier CR–1A in the A channel and a reverse voltage maintained across it for a sufficiently long period of time to insure its turn off. Unless these conditions prevail, the triggering action will not occur and consequently CR–1B will not be energized. Hence, there is a positive acting fail-safe interlock between the two controlled rectifiers preventing both of them from being in the conductive condition simultaneously. Other features of the interlock system are described in the aforesaid copending application.

Inverter RMS current clamp

As described more fully in the aforesaid copending application, under certain conditions the inverter circuit of FIGURE 1 tends to store power each cycle. When not fully loaded, it behaves like an underdamped oscillator, the amplitude of which builds up from cycle to cycle. This action is eliminated by limit circuits associated with the two channels of the inverter including a winding W–2A coupled to winding W–1A and a winding W–1B coupled to winding W–2B. Illustratively, these windings are in a one-to-one ratio and are polarized as indicated. One side of each of these additional windings is connected via a respective diode D2A and D2B to the common branch of the two channels. The other side of winding W–1B is connected to the positive input terminal $J_1$ of channel A while the other terminal of winding W–2A is connected to the negative input terminal $J_2$ of channel B. The function of each of these circuits is to automatically limit the swing of the respective primary windings, W–1A and W–1B for all operating load values such that the peak charge on $C_s$ does not vary in an adverse way from cycle to cycle and specifically does not continuously build up. As a consequence, the difference between the power available and the power required by the load is returned to the source. The current clamp also promotes continuous inverter current flow as described more fully in said copending application. It may be seen that the amplitude control system utilizes a clamp which limits the RMS current to a 50% increase from no load to full load by providing a flow back part for energy stored in W–1A, W–2B to the source represented by C–1A and C–1B. Control is effected on a cycle-to-cycle basis but does not control RMS current as a function of source voltage.

As forward current in the resonant circuit decays due to the limiting action, the saturable inductance L–CA comes out of the saturated state and supplies an additional charge to $C_s$; this charge acts as a source of turn-off energy for the respective trigger circuit, insuring commutation notwithstanding the presence of limiting action. Saturable inductance L–CB performs a similar function during the other half cycle. Hence, dead time in the load current wave form is avoided.

A and B trigger circuits of controlled rectifier interlock system

As noted previously, the cut-off current flowing in CR–1A at the end of the conduction period in Channel A is diverted to the input of the trigger circuit as CR–1A is being cut off. This current flows in winding W–3A thereby inducing a voltage in a secondary winding W–4A. The transformer T–3A which includes these windings is of the saturable type and the voltage appearing across W–3A is of a polarity which insures a continued reverse bias across CR–1A. In this connection it should be noted that the inductance of W–3A is larger than that of W–1A; hence the natural period of the resonant circuit which includes this branch is materially longer than the period of the main power circuit before saturation; the duration of the reverse bias voltage applied to CR–1A is thus increased.

The voltage induced in winding W–4A from W–3A is applied to the series combination of resistance R2A, diode D–4A and capacitor C–2A. As a result, the voltage across C-2A commences to rise. The effect of this voltage is to actuate the B trigger circuit thereby causing CR–1B to fire.

As shown in FIGURE 2 which duplicates the trigger input circuit described above, the voltage across C–2A is supplied from W–4A via R2A, D4A, and is applied to the B trigger circuit which includes windings W202B, W203B and W201B of trigger transformer T200B. Output winding W201B supplies a firing signal between the gate and cathode of CR–1B. This causes the B channel controlled rectifier to fire following the cut-off of the A channel rectifier.

The A and B trigger circuits are generally the same as the corresponding circuits in the aforesaid copending application and operate in the same manner.

To insure that residual charges are not left on the trigger capacitors C2A, C2B, each is provided with a discharge path supplied by the alternate trigger circuit. Thus, C2A discharges via R231, D231 and the collector-emitter of Q201A when the A trigger operates. A similar arrangement including R230, D230 and Q201B discharges C2B when the A system is turned on.

Turn-on system

During system turn-on, and with both controlled rectifiers CR–1A and CR–1B deenergized, there may be no effective energizing path to supply an appropriate trigger signal to either of the controlled rectifiers. In a typical case there may not be a sufficient rate of change of current through W–3A or W–3B to effect triggering. This may result from the relatively slow rate of rise of source potential.

To obviate this difficulty, a turn-on system is provided which includes an auxiliary path between the source $J_1$ and the trigger B input. This path is shown in part in FIGURE 1 and comprises resistance R150 and diode D151. The function of this path is to supply a source of charging current to the capacitor C–2A so that its voltage may rise to a value sufficiently high to actuate the B trigger circuit which is accordingly designed to fire first. This insures the initial turn-on of controlled rectifier CR–1B. A "Restart" circuit ties in with this turn-off path as shown schematically in FIGURE 1 and in detail in FIGURE 2. It is described hereinafter.

RMS current control

The amplitude of circulating currents in the resonant channels of the inverter have values which depend on source voltage and circuit Q. A change in source voltage or a load change affecting Q will change these RMS currents. Effects of load change are partially limited by the current clamp system hereinbefore described. The RMS control system described below supplements this action and also provides limiting as required by source voltage changes. The technique involves control over the discharging of energy from $C_s$ as contrasted with the controlled return of energy from the inductive elements to the source utilized in the current clamp system.

For maximum efficiency, it is desirable to keep the circulating RMS current in a minimum ratio with respect to the output DC current. However, under the conditions of an increase in line voltage or a decrease in load resistance, the RMS current tends to rise thereby reducing efficiency. This loss of efficiency is particularly important in supplies operating at a high frequency because the controlled rectifiers must be derated at such high frequencies in which event the loss of efficiency reduces the maximum ratings which the supply would otherwise have.

In accordance with the invention, a technique has been developed for preventing increases in RMS current notwithstanding changes in the load or line voltage. The current flowing in the inverter channels remains below a predetermined value and as a consequence maximum rated power output can be substantially raised even though the supply is designed to operate over a wide range of load values and the usual range of line voltage variations.

In accordance with the invention, this control over RMS current involves a sensing of the resonant current and the development of appropriate control actions to reduce this current when it exceeds a predetermined level. Hence, a load change which would normally increase the Q and circulating current of the resonant circuits, does not produce this effect when the RMS control is effective.

By way of illustration, a control system is shown in connection with the supply of FIGURES 1 and 2 although the technique is equally applicable to other supplies as well. Referring to FIGURE 1, it may be seen that current in the two inverter channels is sensed by auxiliary windings $W_{RA}$ and $W_{RB}$. These windings develop voltages proportional to the current in the respective channel and these voltages are fed to an RMS control circuit. As shown in FIGURE 1 schematically, the output of this control circuit supplies controllable trigger retarding actions to the A and B trigger circuits, thus providing a controlled delay in the firing of CR–1A and GR–1B in accordance with the extent to which the RMS current tends to exceed a predetermined value.

The RMS control system relies on the fact that current flow in the inverter channels is practically continuous. Hence, wave shape is not critical in sensing the RMS current. On the other hand, the peak current is indicative of RMS current conditions and accordingly means are derived for measuring the peak current by obtaining the time integral of the voltage developed in the windings W–1A and W–2B. This technique is also particularly effective because of the clamping action supplied by windings W–2A and W–1B since the effect of this clamping action is to reduce the significance of zero current intervals in the inverter channels.

Referring to FIGURE 2, it may be seen that the voltages across W–1A and W–2B are transformed to related voltages across windings $W_{RB}$ and $W_{RA}$, respectively. These voltages cause currents to flow through R100, D100, and R101, D101, respectively, to a capacitor C100. The voltage across this capacitor is thus a measure of the time integral of the voltages appearing across W–1A and W–2B.

The voltage across C100 is applied to an RMS control stage which includes an npn transistor Q20. When RMS current is not excessive, this stage is cut off. As seen in the figure, the base thereof is connected via a Zener diode DZ103 to a potentiometer R102 which is connected across the integrating capacitor C100. The emitter on the other hand is tied to the common leg of the supply via junction $J_C$.

Stage Q20 functions as a DC amplifier, the collector-emitter circuit of which provides controllable paths which retard the actions of the A and B triggers. Note that a connection is made from the junction of R203B and DZ200B in the B trigger circuit through diode D121, R121, diode D106 and the collector-emitter of Q20 to the common line of the trigger circuit and the inverter. A similar path is connected to the collector of Q20 from the A trigger circuit and involves D120, R120 and D105. Capacitor C105 and C106 comprise AC by-passes.

It can be seen that conduction of Q20 causes the diversion of trigger current in both trigger circuits. This current, which would normally charge C200B in the B trigger circuit to the point where Q201B is fired, has a component diverted through D121, R121, D106 and Q20. This has the effect of retarding the voltage rise on C200B thus delaying the generation of the B trigger when Q20 is energized. A similar action occurs with respect to the A trigger circuit.

When the RMS current in the inverter channels exceeds a predetermined amount established by the setting of R102, Q20 is turned on producing the above described delay action. Consequently, the controlled rectifiers fire at a later period, thus permitting increase flow back and maintaining the RMS current at its appropriate amplitude. It may be noted that this technique is effective no matter what condition, e.g., line voltage or load change, causes the RMS current to rise. Furthermore, the technique is loosless and operates directly on the main inverter switches rather than on complicated auxiliary elements.

Turn-on delay

The RMS control circuit is also employed to delay triggering during turn-on. Thus, as the supply is energized, the voltage across C–1A and C–1B rises. However, until the voltage across C–1B exceeds the drop across DZ105, the diode D104 is forward biased causing Q20 to be switched on. As a result, triggering is delayed until the input voltages from the rectifier reach a required amount. As a consequence, the effectiveness of the auxiliary turn-on path R150, D151 previously described, is temporarily disabled until the source voltages reach appropriate values.

Turn-off transient control

When the supply is turned off, capacitors C–1A and C–1B start to discharge. This reduces the amplitude of current in the inverter channels causing a corresponding reduction in voltages throughout the system. In this event, the conrol rectifiers CR–2A and CR–2B may not have sufficient energy to fire, thereby producing a transient rise in the output.

As C–1A and C–1B discharge, the voltage across C–1B becomes less than the drop across DZ105. Hence D104 becomes forward biased causing Q20 to switch on as described hereinbefore. With Q20 switched on, the triggers are retarded sufficiently to bring inverter oscillation to a rapid stop without any over-shoot.

Overload transient control system

As previously noted, turn-on involves the triggering of CR–1B. During such turn-on, the voltage across $C_s$ typically approaches some value, for example, 80 volts, and is of a polarity whereby the side connected to output terminal $O_2$ is positive. Following the actuation of CR–1B and during the conduction period thereof, this voltage across $C_s$ rises to some new value $E_2$. This value may not be sufficiently different from the source voltage $E_b/2$ to actuate the A trigger circuit for firing CR–1A. This is especially the case during overload conditions. As a result, the system following an overload will not oscillate as required. The turn-on action as previously described would then recommence, causing the voltage on $C_s$ to decay. However, it may not decay sufficiently rapidly to eliminate the aborted firing just described.

To overcome this problem, the overload "restart" circuit is provided. It functions to sense the drop across $C_s$ as shown in FIGURE 1 and to prevent CR–1B from firing until the charge on $C_s$ has dissipated. Circuit details are shown in FIGURE 2 and include transistor stage Q30 having its emitter connected to the left side of $C_s$ and its base connected via R152 to the right side of $C_s$. Hence, the emitter-base circuit, together with R152, is connected across the switching capacitor. It may be seen that with the $O_2$ side of $C_s$ positive as just described, the emitter-base circuit of Q30 is energized and collector-emitter current flows; since the collector is connected to the junction of R150 and D151, a path shunting D151 and L2A is provided for preventing the charging of C-2A until $C_s$ is fully charged. Following this, C2A is charged causing actuation of the B trigger circuit and firing of CR-1B.

Output regulating circuits

As noted previously, two controlled rectifiers, CR-2A and CR-2B are connected across the inverter output terminals $O_1$ and $O_2$. The firing times of these rectifiers determine the amount of inverter current which is diverted from the primary T-P (FIG. 1) of transformer T-5. In this way, the power transferred to the output circuit is controlled.

Control over rectifiers CR-2A and CR-2B involves a phase reference circuit shown in FIGURE 1. This reference circuit includes a pair of resistors R84a, R84b. Connected across the pair is capacitor C81 which is connected in turn across C80, R83.

Connected in parallel with C80 is the emitter-collector circuit of pnp stage Q5A; the collector is connected to the potential point designated $E_V$ which is obtained from the auxiliary supply (FIG. 2) while the emitter is connected to another reference potential point designated $E_A$ which is positive relative to $E_V$ and is also obtained from the auxiliary supply.

Connected between the base and emitter of Q5A is a resistance R80. The base-emitter circuit is gated from the outputs of winding W-5A of saturating transformer T-3A and winding W-5B of T-3B, via source $E_T$-$E_A$, via R5A and R5B, respectively, and via D57. During the conduction periods of inverter-rectifiers CR-1A, CR-1B there is no turn-on signal from these windings and a saw-tooth of voltage is developed across C80 in the phase reference circuit by virtue of charging current flowing out of terminal $E_A$ through R8 and the capacitor to terminal $E_V$. During these periods, Q5A is cut off. At the end of each conduction period of the inverter, a pulse of voltage is coupled into windings W-5A or W-5B in the same manner as described in connection with the trigger voltage induced in companion windings W-4A, W-4B. The voltage alternately induced in W-5A and W-5B causes transistor Q5A to be switched on thus causing capacitor C5A to discharge. The time constants and other circuit parameters are so selected that a generally saw-tooth shaped signal results across R84a, R84b. This saw-tooth occupies a period equal approximately to one half of the alternating cycle of the inverter.

The saw-tooth is coupled to the base of Q2 in the regulating system. Also coupled to the base of Q2 is the output of npn transistor stage $Q_1$. This stage has its base-emitter circuit energized by the error voltage resulting from the departure of the output voltage from the selected reference potential and is similar to the system employed in the aforesaid copending application. The sum of the amplified error signal and the saw-tooth voltage appears at Q2 and the level of the saw-tooth varies as a function of the error signal.

The pnp stage Q2 is normally biased to the *on* state. In this condition emitter-collector current in $Q_2$ flows from terminal $E_V$ through the emitter and collector of $Q_2$ and thence via R16 through the base and emitter of $Q_3$ back to potential point $E_D$ of the auxiliary supply. However, when the saw-tooth reaches a point determined by the amplitude of the error signal, stage $Q_2$ is turned off. The resultant cut-off of $Q_3$ causes energization of the appropriate trigger circuit $Q_{10}$ or $Q_{11}$ causing the associated controlled rectifier CR-2A or CR-2B to fire depending upon which half-cycle of operation exists in the inverter circuit.

The trigger circuits for CR-2A, CR-2B are supplied with gating potentials from the secondary T-S2 of transformer T-5. The CR-2B trigger circuit includes npn transistor stage Q10 having its base connected via resistances R61, R60b to one terminal of the transformer secondary T-S2. The emitter is connected to the center-tap which is also connected to potential point $E_V$ of the auxiliary supply. The base of Q10 is also connected via a diode D67 and a resistance R62 to the collector of the regulator stage $Q_3$ previously described. A further connection to the base includes resistance R65, diode D63 and regenerative winding W9C of trigger-out transformer T8D, the secondary winding W8C of which is used to supply the trigger to the gate and cathode of controlled rectifier CR-2B indicated in FIGURE 1. The other side of winding W9C is connected to the common bus $E_V$ connected to the center-tap of T-S2.

The CR-2B trigger circuit also includes a winding W10C connected to the collector of Q10. The other side of this winding connects to a capacitor C55, the function of which is described hereinafter.

The CR-2A trigger circuit is identical to the "2B" trigger circuit and functions in the same manner as will be described below.

Secondary winding T-S2 serves as a source of gating potential; when terminal X is negative with respect to the center-tap, stage Q10 is cut off since its base-emitter circuit is energized from this winding. Hence, during this half-cycle of inverter operation, the "2B" trigger circuit is disabled. During the next half-cycle, the polarity of this potential reverses, causing current to flow out of terminal X. If the regulator clamp stage $Q_3$ is conducting, signalling no need for firing the "2B" trigger channel, then the current flowing out of terminal X flows via R61, D67, R62 through the collector-emitter circuit of $Q_3$ and thence through terminals $E_D$ and $E_V$ of the auxiliary supply back to the center-tap. If, however, the error signal is of an amplitude causing $Q_3$ to be cut off and thereby signifying the need for the firing of CR-2B at that particular instant of time to reduce the output, then the current flowing out of terminal X flows instead through the base-emitter circuit of Q10 causing it to turn on.

The switching on of Q10 causes current flow through winding W10C as follows: From potential point $E_K$ adjacent Q7 (also shown in the auxiliary supply, FIG. 2) current flows through the emitter-collector of Q7 thence through winding W10C, the collector-emitter of Q10 to potential point $E_V$. Regenerative action is promoted by reason of the voltage induced in winding W9C since this voltage supplies additional base-emitter current to Q10. Maximum conduction is rapidly achieved through winding W10C causing a trigger to be induced into secondary winding W8C. As previously mentioned, this trigger switches on controlled rectifier CR-2B at the appropriate instant of time causing current to be diverted from the output circuit in conformity with load requirements.

During the above interval of time, the "2A" trigger circuit has been disabled and the operation of that arrangement is similar to the action in the "2B" trigger circuit. Hence, at an appropriate instant of time in the next half-cycle, CR-2A is fired, diverting excessive load current from the output circuit as a function of the error signal.

Balance system

Under certain circumstances, the voltages across C-1A and C-1B tend to become unbalanced causing undesirable asymmetrical operation. To prevent this, the trigger retard circuits may be activated to maintain the proper balance. This is accomplished with stages Q21 and Q22, and their associated components. As seen in FIGURE 2, the positive side of C-1A, i.e., junction $J_1$, is connected to a branch comprising R109, R108, the base-emitter of Q21, the base-emitter of Q22, and R110, the other end of which is connected to input terminal $J_2$. Hence, this circuit is connected across the input capacitors. The emitter of Q21 and base of Q22 are also connected to the junction of C-1A and C-1B. These stages will accordingly conduct in such a manner as to maintain the voltages across C-1A and C-1B equal.

Auxiliary supply

The auxiliary supply which provides reference potential $E_B-E_D$(Vref) as well as necessary supply voltages at $E_A$, $E_V$, $E_T$, etc., is illustrated in FIGURE 2. This circuit is supplied with an AC potential from windings $W_{PA}$, $W_{PB}$ which are coupled to the inverter chokes W–1A and W–2B, respectively. A full wave rectifier D300, D301 converts this voltage into a direct voltage which appears at terminals $E_A$ and $E_V$ and which passes through the regulating circuit Q40 to supply voltages to $E_B$ and $E_D$. Voltage $E_K$ is obtained from a capacitor C301 connected to the full wave rectifier via D302. This voltage supplies energy to the "2A" and "2B" trigger circuits via $Q_7$, FIG. 1.

Auxiliary power during start

After the start of operation, inverter oscillation commences when the charge across source capacitor C–1B, FIG. 2, exceeds the drop across DZ105. At that time, stage Q20, which was initially energized at turn-on as described hereinbefore, is turned off since D104 becomes reverse-biased and RMS control has not been activated by excessive RMS current. When inverter oscillation commences, it is originally of a low value and may not supply sufficient energy to fully energize the auxiliary supply. This can prevent the development of adequate trigger energy to fire the CR–2A, CR–2B rectifiers in the regulator thus causing overshoot during the start interval.

To overcome this, an auxiliary source of energy for the 2A and 2B triggers is provided in the form of a charge on capacitance C55 (FIG. 1) which is connected to the common terminals of trigger windings W10C, W10D. The capacitor is charged from source $E_K$ via $Q_7$. Stage $Q_7$ is turned on when stage $Q_6$ is activated. This occurs only during the start of the power cycle, i.e, during flow back, because at this time, the base-emitter of $Q_6$ is gated on by the output of windings W–5A, W–5B. These windings energize $Q_6$ via respective connections R58, D58 and R59, D59 which are connected to the emitter of $Q_6$. Hence, the supplementary source of energy from C55 is made available at the proper intervals of the power cycle.

It should be understood that in studying and practicing the invention modifications will undoubtedly occur to those skilled in the art. The invention is thus not to be limited to the specific circuits and components herein shown and described but departures may be made therefrom within the scope of the accompanying claims.

What is claimed is:

1. Apparatus for improving efficiency in power supplies employing a resonant circuit energized by a source, having reversible energy flow to and from said source, and having a current control element therein comprising control means for minimizing changes in the resonant current in said cirucit resulting from changes in effective Q due to load change, said control means including sensing means operatively connected to said circuit for sensing the magnitude of a resonant current parameter in said circuit, and current control means responsive to said sensing means for controllably retarding the activation of said current control element to control said resonant current.

2. Apparatus as defined in claim 1 in which said current control means include limiting means for controlling the operation of said current control element to limit said current to a predetermined maximum value.

3. Apparatus as defined in claim 1 including an output regulator system responsive to load conditions for controlling the output taken from said resonant circuit.

4. Apparatus as defined in claim 1 in which said sensing means include means responsive to the rate of change of said resonant circuit current and integrating means responsive to said rate of change means for supplying said current control means.

5. Apparatus as defined in claim 1 in which said current control element comprises switching means and said current control means include means for controlling the turn-on time of said switching means for returning energy to said source to thereby limit said current.

6. Apparatus as defined in claim 3 in which said means for controlling turn-on time include circuit means for retarding turn-on of said switching means.

7. Apparatus as defined in claim 1 in which said sensing means comprise inductive winding means transformer coupled to the inductance in said resonant circuit.

8. Apparatus as defined in claim 7 in which said sensing means include integrating means energized by said inductive winding means.

9. Apparatus as defined in claim 8 in which said current control means including means responsive to said integrating means for controllably retarding the activation of said current control element.

10. Apparatus as defined in claim 1 in which said sensing means comprise means coupled to the inductive component of said resonant circuit and said current control means comprise means coupling said sensing means to said source.

11. Apparatus as defined in claim 10 in which said sensing means comprise an inductance and said control means comprise circuit connections for transferring energy from said inductive component to said source via said inductance.

12. Apparatus as defined in claim 10 in which said control means include diode means.

13. A series type inverter having a pair of switched resonant circuits excited from a center-tapped direct current source, an output circuit connected in the common branch of said resonant circuits and controlled switch means for each of said resonant circuits, means for limiting the RMS current in each resonant circuit comprising sensing means inductively coupled to each circuit for sensing the current therein and means for transferring energy back to said source when said current is excessive comprising means for controllably retarding the activation of said switch means.

14. Apparatus as defined in claim 13 in which said sensing means include means for measuring the peak resonant current.

15. Apparatus as defined in claim 13 in which said control means comprise means for transferring excess energy from the inductive component of said resonant circuits to said source.

References Cited

UNITED STATES PATENTS 3,120,634  2/1964  Genuit _____ 321—18 XR
3,319,147  5/1967  Mapham _____ 321—18 XR JOHN F. COUCH, *Primary Examiner.*

W. SHOOP, *Assistant Examiner.*

U.S. Cl. X.R.

321—18, 45